2,890,880

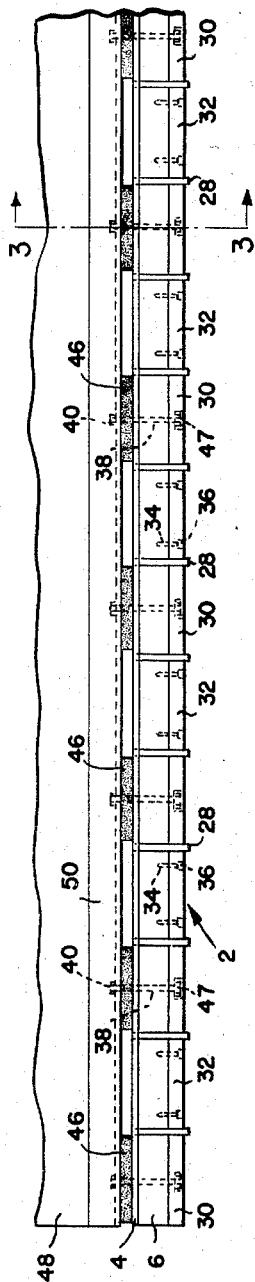
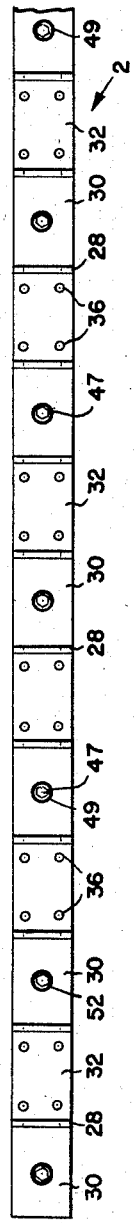
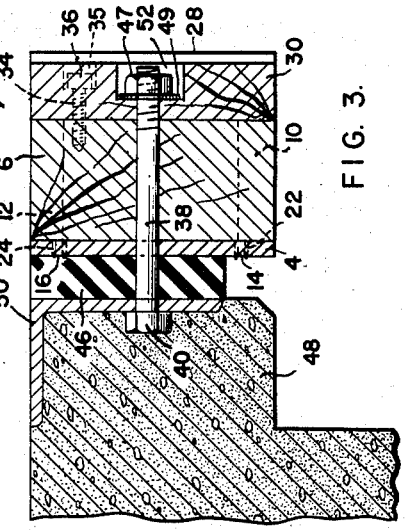
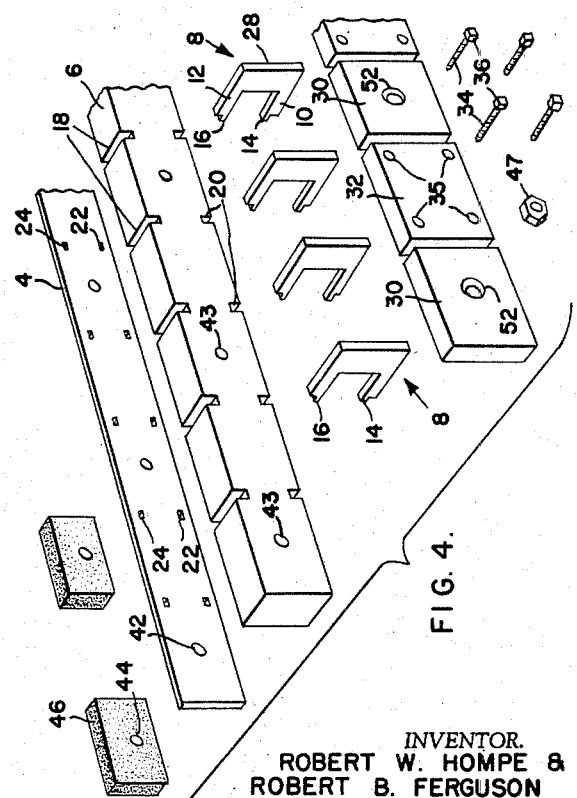
INVENTOR.
ROBERT W. HOMPE &
ROBERT B. FERGUSON United States Patent Office 2,890,880
Patented June 16, 1959

PLATFORM BUMPER

Robert W. Hompe, Ithan, Pa., and Robert B. Ferguson, Elk Township, Gloucester County, N.J., assignors to Smith, Kline & French Laboratories, Philadelphia, Pa., a corporation of Pennsylvania Application September 20, 1957, Serial No. 685,282

4 Claims. (Cl. 267—1)

This invention relates to a platform bumper suitable for use, for example, with a truck loading platform.

The platform bumper in accordance with this invention is highly advantageous in that it has a resiliency which is superior to that of the conventionally used timber bumper and because its unique construction prevents the destruction or defacement of the bumper due to impact. The bumper of this invention is further advantageous in that should a portion of it become damaged or unsightly the particular marred portion can readily be replaced without the necessity for replacing the entire bumper.

The invention will be fully understood from a reading of the following description in conjunction with the drawings in which:

Figure 1 is a plan view of a platform bumper in accordance with this invention;

Figure 2 is a front elevation of the bumper of Figure 1;

Figure 3 is a vertical section through the bumper taken on the plane indicated by the line 3—3 in Figure 1; and Figure 4 is an exploded perspective view of the elements of the bumper of Figure 1.

As shown in the figures, a platform bumper 2 in accordance with this invention has a resilient metal backing plate 4, preferably of steel, which is abutted on its front face by a wooden beam 6.

Beam 6 preferably will be formed from a hard wood. Exemplary of satisfactory hard woods are, for example, white oak, black oak, red oak, white ash and beech.

Guard members 8 each having inwardly extending legs 10 and 12 provided with reduced inner ends 14 and 16 are secured to plate 4. Legs 10 and 12 fit snugly in slots 18 and 20 in beam 6. The reduced ends 14 and 16 pass through openings 22 and 24 in plate 4 and are welded to plate 4 in order to fixedly secure each member 8 to plate 4.

Each member 8 has a guard portion 28 which extends outwardly from beam 6. Blocks 30 and 32 fit alternately between adjacent guard portions 28. Blocks 30 and 32 are of wood and preferably of a hard wood, for example, one of the hard woods listed above. Blocks 32 are secured to beam 6 by a plurality of lag screws 34 and are countersunk at 35 to receive heads 36.

Each bolt 38 whose head 40 is embedded in loading platform 48 behind angle member 50 passes through opening 42 in plate 4, opening 43 in beam 6 and block 30. Bolt 38 in addition passes through an opening 44 in a resilient member 46 interposed between loading platform 48 and plate 4. Member 46 may be, for example, formed of rubber. Each block 30 is countersunk at 52 to receive nut 47 and washer 49.

It will be noted that when the bumper 2 is installed ready for use, that guard portions 28 of members 8 extend outwardly beyond the outer faces of blocks 30 and 32. In actual operation the guard portions 28, being relatively closely spaced, act to prevent a lowered tailgate or other structural portion of a truck from striking blocks 30 or 32. Should the vehicle strike guard portions 28, the force acts on the resilient members 46, plate 4, beam 6 and blocks 32. It is evident that any force acting perpendicular to the outer face of the bumper will initially be absorbed by resilient members 46 and subsequently by the flexing of plate 4. The flexing of plate 4 is resiliently resisted by the beam 6, blocks 30 and 32 which act to resist the lateral movement of members 8. Further, in the event of a component of force which is not perpendicular to the front face of the bumper, it will readily be seen that such a component will be resisted resiliently by beam 6 and blocks 30 and 32 or in the case of a vertical component by beam 6 alone.

Thus it will be apparent that the bumper of this invention is able to withstand a substantial force while minimizing the damage to the object striking it. In addition, the bumper of this invention performs its function without being damaged. In the event of any minor damage by way of defacement of the face of the bumper, the damage can readily be repaired by replacement of one or a few blocks of blocks 30 and 32.

It is not desired to be limited except as set forth in the following claims.

What is claimed is:

1. A platform bumper comprising a resilient metal backing plate, a wooden beam abutting one face of said plate, substantially U-shaped members each having a pair of legs and an outer guard portion, said legs being secured to the plate, and said beam being slotted to accommodate said legs and wooden blocks abutting against said guard portions and said beam to partially fill the gap between the guard portions, the guard portions of each of said members extending beyond the outer faces of the adjacent blocks.

2. A platform bumper comprising a resilient steel backing plate, a wooden beam abutting one face of said plate, substantially U-shaped members each having a pair of legs and an outer guard portion, said legs being secured to the plate, and said beam being slotted to accommodate said legs and wooden blocks abutting against said guard portions and said beam to partially fill the gap between the guard portions, the guard portions of each of said members extending beyond the outer faces of the adjacent blocks.

3. A platform bumper comprising a resilient metal backing plate, a wooden beam abutting one face of said plate, substantially U-shaped members each having a pair of legs and an outer guard portion, said legs being secured to the plate, and said beam being slotted to accommodate said legs, wooden blocks abutting against said guard portions and said beam to partially fill the gap between the guard portions, the guard portions of each of said members extending beyond the outer face of the adjacent blocks and spaced resilient blocks on said backing plate and adapted to interpose between the rear face of the backing plate and a platform.

4. A platform bumper comprising a resilient steel backing plate, a wooden beam abutting one face of said plate, substantially U-shaped members each having a pair of legs and an outer guard portion, said legs being secured to the plate, and said beam being slotted to accommodate said legs, wooden blocks abutting against said guard portions and said beam to partially fill the gap between the guard portions, the guard portions of each of said members extending beyond the outer faces of the adjacent blocks and spaced resilient blocks on said backing plate and adapted to interpose betwen the rear face of the backing plate and a platform.

References Cited in the file of this patent

UNITED STATES PATENTS

| | | |
|---|---|---|
| 1,013,584 | Brunnier | Jan. 2, 1912 |
| 1,089,745 | Brunnier | Mar. 10, 1914 |